(12) United States Patent
Roger et al.

(10) Patent No.: US 9,923,750 B2
(45) Date of Patent: Mar. 20, 2018

(54) HIGH SPEED PULSE MODULATION SYSTEM

(71) Applicant: Infineon Technologies AG, Neubiberg (DE)

(72) Inventors: Andre Roger, Munich (DE); Romain Ygnace, Brunnthal (DE); Juergen Schaefer, Oberhaching (DE); Matthias Marquardt, Hannover (DE); Ljudmil Anastasov, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/184,114

(22) Filed: Jun. 16, 2016

(65) Prior Publication Data

US 2017/0366385 A1 Dec. 21, 2017

(51) Int. Cl.
| | |
|---|---|
| *H04L 27/14* | (2006.01) |
| *H04L 27/16* | (2006.01) |
| *H04L 27/22* | (2006.01) |
| *H04L 27/26* | (2006.01) |
| *H04L 27/02* | (2006.01) |
| *H04L 27/10* | (2006.01) |

(52) U.S. Cl.
CPC .......... *H04L 27/2697* (2013.01); *H04L 27/02* (2013.01); *H04L 27/10* (2013.01)

(58) Field of Classification Search
CPC ..... H04L 27/2697; H04L 27/02; H04L 27/10; H03F 1/0244; H03L 7/085; G01S 7/4008

USPC ....... 375/219, 220, 222, 295, 316, 325–327, 375/296; 342/100; 327/156
See application file for complete search history.

(56) References Cited

U.S. PATENT DOCUMENTS

| | | | | |
|---|---|---|---|---|
| 5,146,477 | A * | 9/1992 | Cantoni | H04J 3/07 370/506 |
| 7,508,281 | B2 * | 3/2009 | Kobata | H03L 7/085 327/156 |
| 7,737,885 | B2 * | 6/2010 | Winkler | G01S 7/4008 342/100 |
| 2012/0063543 | A1 * | 3/2012 | Gustavsson | H03F 1/0244 375/296 |

* cited by examiner

*Primary Examiner* — Phuong Phu
(74) *Attorney, Agent, or Firm* — Schiff Hardin LLP

(57) ABSTRACT

A modulator operable to control an oscillator is described. The modulator can include a memory that stores oscillator control values and a bit streaming block. The bit streaming block can generate a bit stream based on the oscillator control values and transmit the bit stream to the oscillator to control an oscillation frequency of the oscillator. The modulator can also include a bit streaming loader (BSL). The BSL can receive one or more of the oscillator control values from the memory, generate one or more corresponding bit values based on the one or more of the oscillator control values, and provide the one or more bit values to the bit streaming block. The bit streaming block can then generate the bit stream based the one or more bit values generated by the BSL.

19 Claims, 4 Drawing Sheets

HIGH SPEED PULSE MODULATION SYSTEM

BACKGROUND

Field

Embodiments described herein generally relate to oscillation control systems, such as those used to control a voltage-controlled oscillators (VCO), including a VCO of a sensor system.

Related Art

A voltage-controlled oscillator (VCO) is an electronic oscillator whose oscillation frequency is controlled based on a voltage input. In operation, the applied input voltage determines the instantaneous oscillation frequency of the VCO. In some cases, modulating signals can be applied to the VCO input to cause frequency modulation (FM) or phase modulation (PM) of the oscillated output signal.

Conventionally, an external phase locked loop (PLL) has been used to control a VCO, but external PLLs increase the complexity and cost in systems implementing external PLLs.

External digital-to-analog (DAC) devices can also be used to control VCOs, but require a stable output voltage with a high signal-to-noise ratio (SNR), high update rate requirements, and additional power supply requirements.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The exemplary embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

As an overview, a voltage-controlled oscillator (VCO) can be used in a sensor system such as a radar system. The radar system can be used in automobiles or other devices. The VCO can generate an oscillation frequency (e.g., transmission frequency) that can be used to drive the transmitter of the radar system and can be mixed with a signal received by the radar system.

For discussion purposes, the embodiments will be described as implementations of radar systems, but are not limited thereto. The embodiments described herein are not limited to radar system implementations and can be used as standalone systems or can be implemented in other systems as would be understood by one of ordinary skill in the relevant arts.

Figure 1:
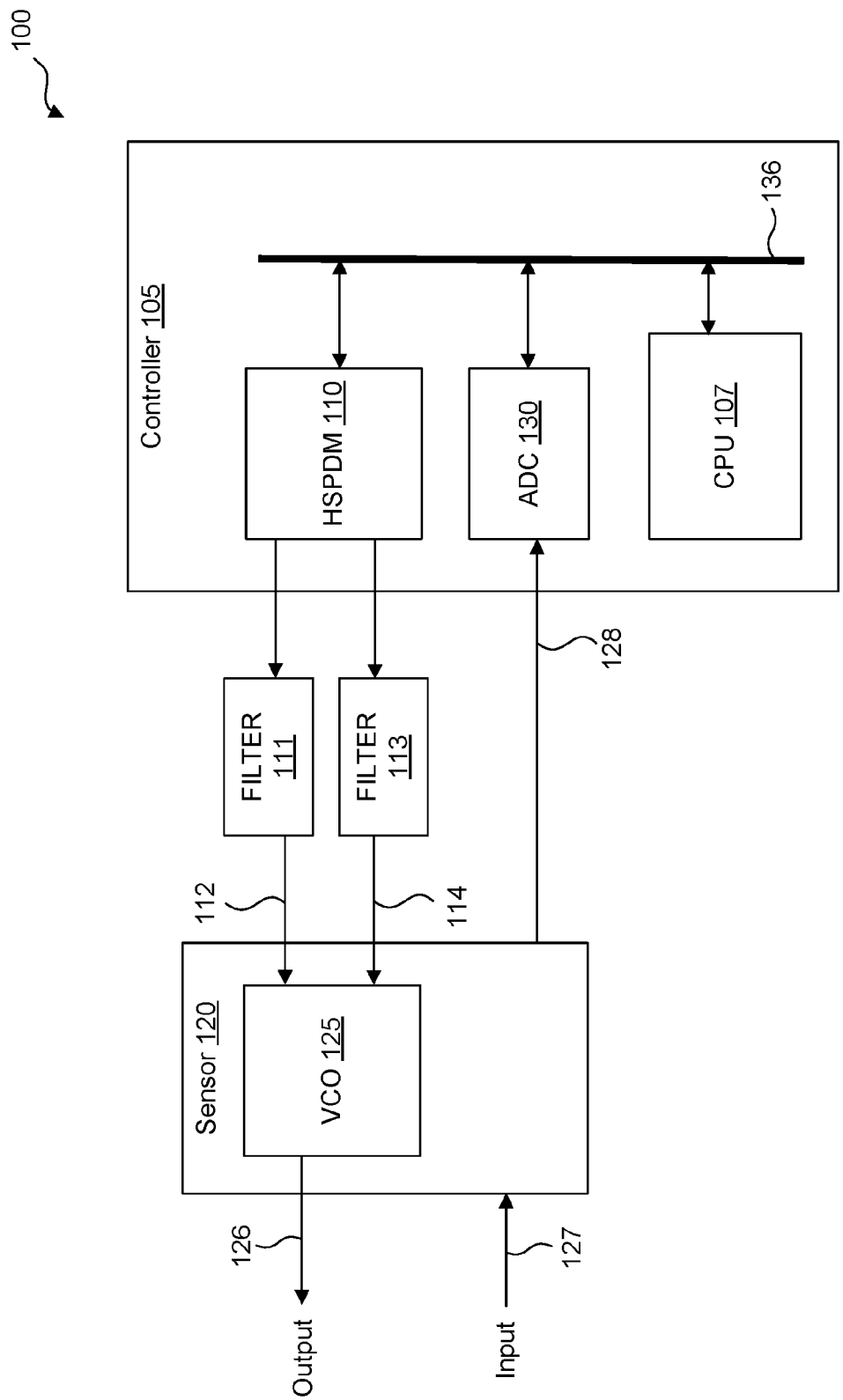
FIG. 1 illustrates a sensor system according to an exemplary embodiment of the present disclosure.

FIG. 1 illustrates sensor system 100 according to an exemplary embodiment of the present disclosure. The sensor system 100 can be a radar system, but is not limited thereto. The radar system 100 can be implemented in an automobile, or other device.

The radar system 100 includes a controller 105 connected to a sensor 120.

The sensor 120 can be configured to measure/sense one or more environmental conditions. In an exemplary embodiment, the sensor 120 is a radar sensor configured to generate and transmit radio waves (e.g., signals 126) to determine the range, angle, and/or velocity of one or more objects based on the returned radio waves signals (e.g., signals 127). The sensor 120 can include processor circuitry configured to measure/sense the environmental condition such as the received radar signals 127.

In an exemplary embodiment, the sensor 120 includes a voltage-controlled oscillator (VCO) 125 configured to generate a transmission frequency (e.g., signal 126) that can be used to drive a transmitter of the sensor 120 and/or mixed with a signal received by the sensor 120. The oscillation frequency of the VCO 125 can be based on one or more input voltages, such as voltages 112, 114 generated by the controller 105. In an exemplary embodiment, the voltages 112, 114 are analog voltages. As discussed in detail below with reference to FIG. 4, the voltage signals 112, 114 are generated from bit streams generated by the HSPDM 110 to drive the VCO 125. In an exemplary embodiment, the sensor system 100 includes filters 111 and 113 that filter output signals of the HSPDM 110 to generate respective voltages 112, 114. In an exemplary embodiment, the filters 111, 113 can be low-pass filters, but are not limited thereto. In an exemplary embodiment, one or more of the filters 111, 113 include one or more resistors, one or more capacitors, one or more inductors, and/or one or more active components such as an operational amplifier. The filters 111, 113 can be the same or different in the exemplary embodiments.

In operation, the sensor 120 can generate one or more analog signals 128 based on the received radar signals 127, and provide the signal(s) 128 to the controller 105. The sensor 120 is described in detail with reference to FIG. 3 below.

The controller 105 can include processor circuitry configured to control the overall operation of the radar system 100 and/or one or more components of the radar system 100, including controlling the operation of the sensor 120. In an exemplary embodiment, the controller 105 includes a high-speed pulse density modulator (HSPDM) 110, an analog-to-digital converter (ADC) 130, and one or more processors 107 that are connected to each other via bus 136. In an exemplary embodiment, the controller 105 is a microcontroller.

The HSPDM 110 can be configured to generate one or more signals and to provide the signals to the VCO 125 of the sensor 120. The signals can be filtered by filters 111, 113 to provide respective voltages 112, 114. The voltages 112 and 114 can be used to control the oscillation frequency of the VCO 125. The HSPDM 110 can include processor circuitry configured to perform the operations of the HSPDM 110. The HSPDM 110 is described in detail with reference to FIGS. 2 and 4 below. The ADC 130 can be configured to sample and/or process one or more analog signals 128 received from the sensor 120. The processing can including converting the analog signals to corresponding digital signals.

The processor(s) 107 can be configured to perform input/output operations of the controller 105, including processing information being provided to one or more components of the controller 105 and/or received from one or more of the components. In an exemplary embodiment, the processor(s) 107 can be configured to generate, process, and/or calibrate one or more voltage-frequency curves associated with the VCO 125, and provide the voltage-frequency curves to the HSPDM 110 via the bus 136. The operation of the processor(s) 107, including the interactions with the HSPDM 110 are described in detail with reference to FIG. 4 below.

Figure 2:
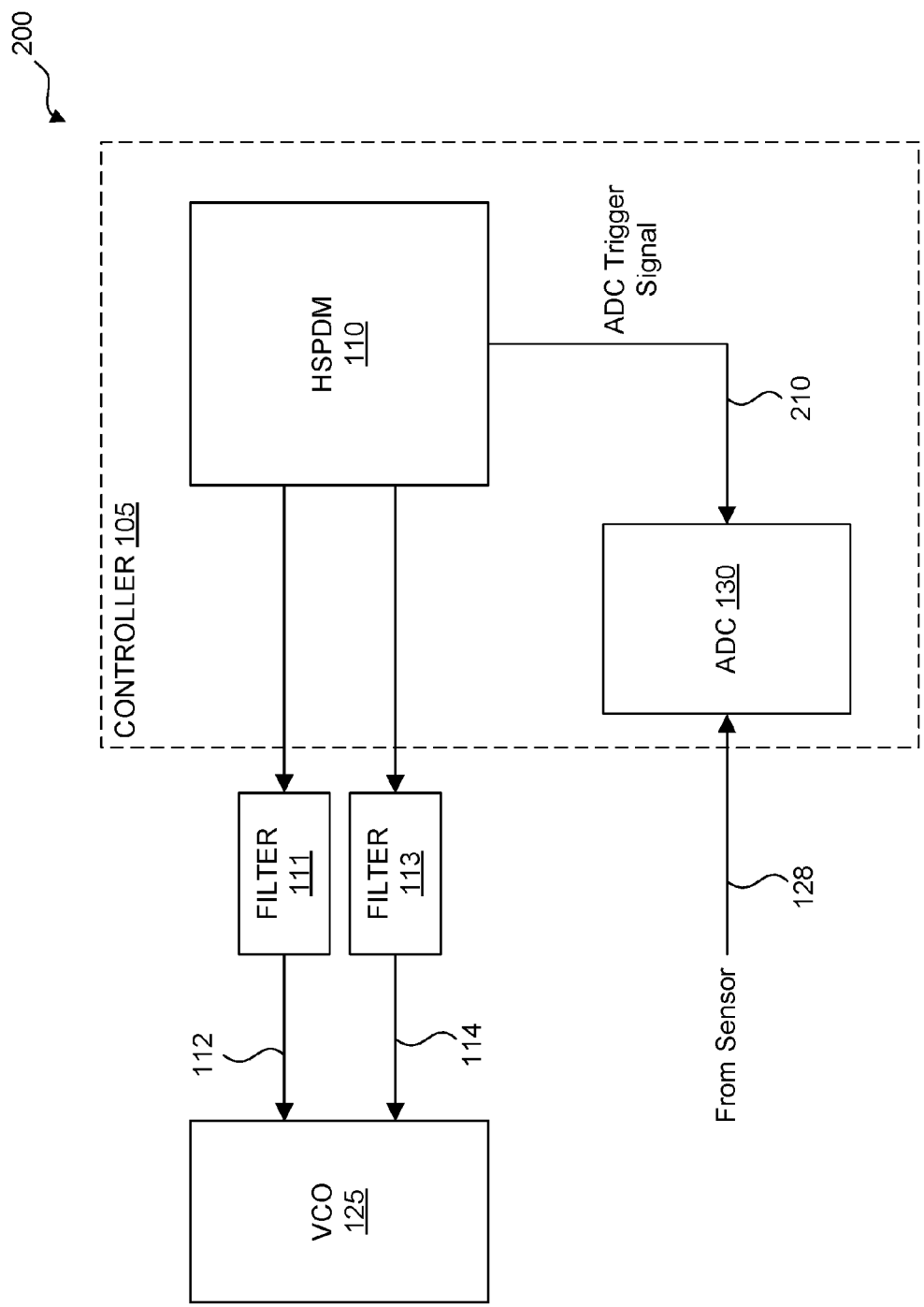
FIG. 2 illustrates a sensor system according to an exemplary embodiment of the present disclosure.

FIG. 2 illustrates a sensor system 200 according to an exemplary embodiment of the present disclosure. The system 200 is an exemplary embodiment of the sensor system 100, and discussion of common components may have been omitted for brevity. The sensor system 200 can be a radar system in one or more embodiments.

In an exemplary embodiment, the HSPDM 110 can be configured to generate one or more ADC trigger signals 210 and provide the ADC trigger signal(s) 210 to the ADC 130. In operation, the ADC 130 can be configured to sample and/or process one or more analog signals 128 received from the sensor 120 based on the ADC trigger signal(s) 210. In an exemplary embodiment, HSPDM 110 is configured to generate the ADC trigger signal(s) 210 based on the bit stream output of the HSPDM 110 (e.g., analog voltages 112, 114). As a result, an edge of one or more of the analog voltage signals 112, 114 and an edge of the ADC trigger signal 210 are synchronized.

In an exemplary embodiment, the HSPDM 110 is configured to generate the analog voltages 112, 114 provided to the VCO 125 by the controller 105. In an exemplary embodiment, the analog voltages 112, 114 can be generated by filtering corresponding signals generated by the HSPDM 110. The signals can be filtered by respective filters 111 and 113. In an exemplary embodiment, the filters 111, 113 can be low-pass filters, but are not limited thereto. In an exemplary embodiment, one or more of the filters 111, 113 include one or more resistors, one or more capacitors, one or more inductors, and/or one or more active components such as an operational amplifier. In an exemplary embodiment, the filters 111, 113 include a resistor connected in series between the HSPDM 110 and the VCO 125 and a capacitor connected between a node between the resistor and the VCO 125 and ground. The filters 111, 113 can be the same or different in the exemplary embodiments.

Figure 3:
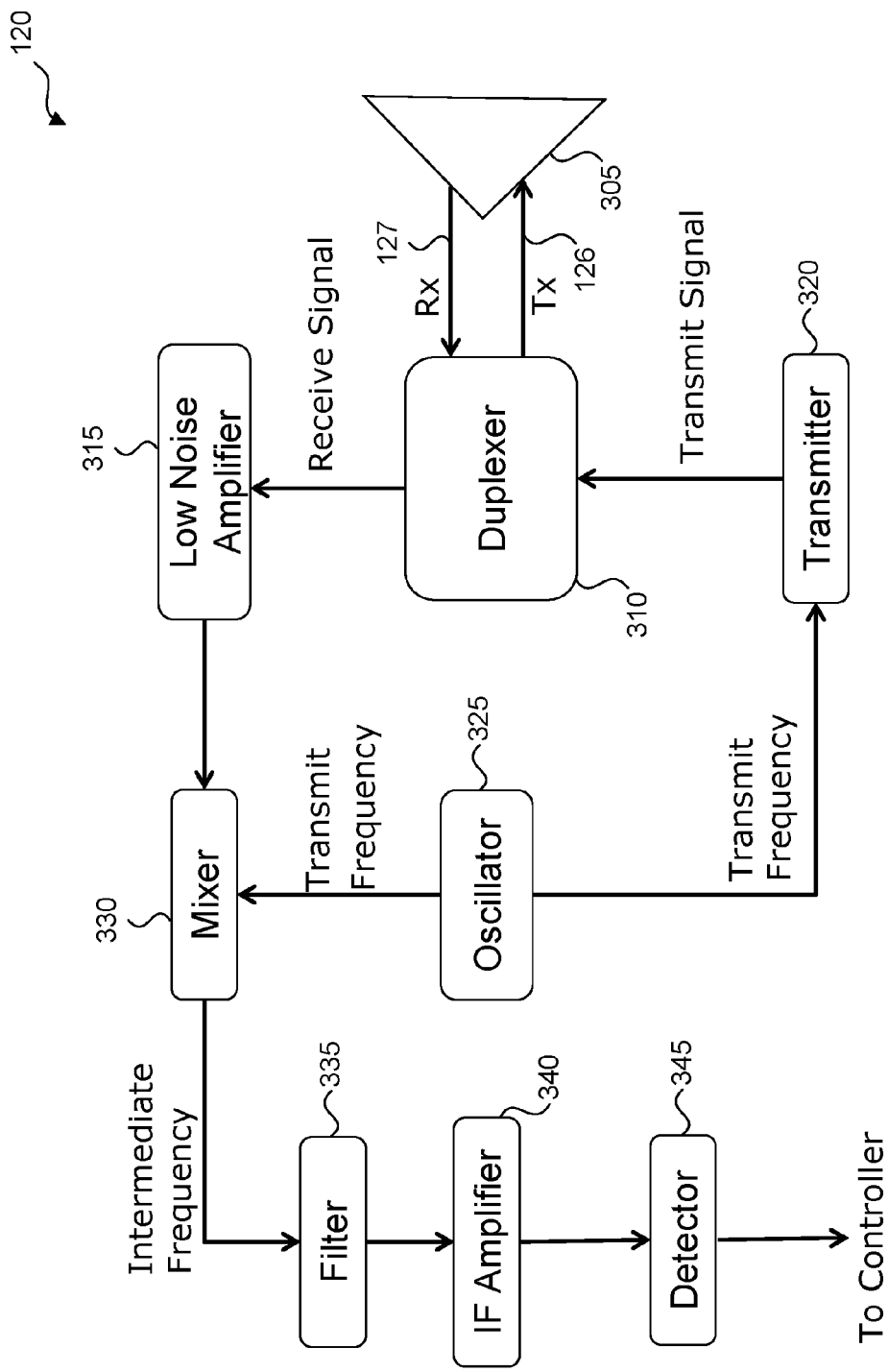
FIG. 3 illustrates a sensor system according to an exemplary embodiment of the present disclosure.

FIG. 3 illustrates the sensor 120 according to an exemplary embodiment of the present disclosure. As discussed above, the sensor 120 can be a radar sensor in one or more exemplary embodiments.

In an exemplary embodiment, the radar sensor 120 includes an antenna 305 that transmits one or more signals 126 and receives one or more signals 127. In operation, transmitted signals 126 are generated by the transmitter 320 and provided to the antenna 305 via duplexer 310.

The duplexer 310 can include processor circuitry configured to allow bi-directional (duplex) communication over a single antenna 305. That is, the duplexer 310 isolates the transmitted signals 126 and the received signals 127 while permitting them to share a common path (e.g., antenna 305). In other embodiment, the radar sensor 120 can include two or more antenna instead of a common antenna 305.

The radar sensor 120 can include a low noise amplifier (LNA) 315 that is configured to amplify a received input signal (e.g., signals 127) and to output the amplified input signal that has been amplified by a predetermined gain value. The amplified signal is then provided to mixer 330. The LNA 315 can include processor circuitry configured to amplify the received input signal.

The oscillator 325 is configured to generate an oscillation frequency, and provide the oscillation frequency to the mixer 330 and/or the transmitter 320. In this example, the transmitter 320 is driven by the oscillation frequency generated by the oscillator 325. In an exemplary embodiment, the oscillator 325 is a VCO, and can be configured to generate the oscillation frequency based on one or more voltages. In an exemplary embodiment, the oscillator 325 is the VCO 125 and is configured to generate the oscillation frequency based on the analog voltages 112, 114 generated by the HSPDM 110.

The mixer 330 can be configured to mix amplified signals from the LNA 315 and the oscillation frequency generated by oscillator 325 to generate an intermediate frequency (IF) signal. The mixer 330 provides the IF signal to filter 335 that is configured to filter the IF signal. The filter 335 can include, for example, resistors, one or more capacitors, and/or one or more inductors.

The filtered IF signal can then be provided to IF amplifier 340 that is configured to amplify the filtered IF signal and to output the amplified signal that has been amplified by a predetermined gain value. The amplified signal (e.g., signal 127 in FIG. 1) is then provided to the detector 345, which is configured to perform one or more signal processing operations on the amplified signal. The processed signal (e.g., 128) can then be provided to the controller 105 as shown in FIG. 1.

Figure 4:
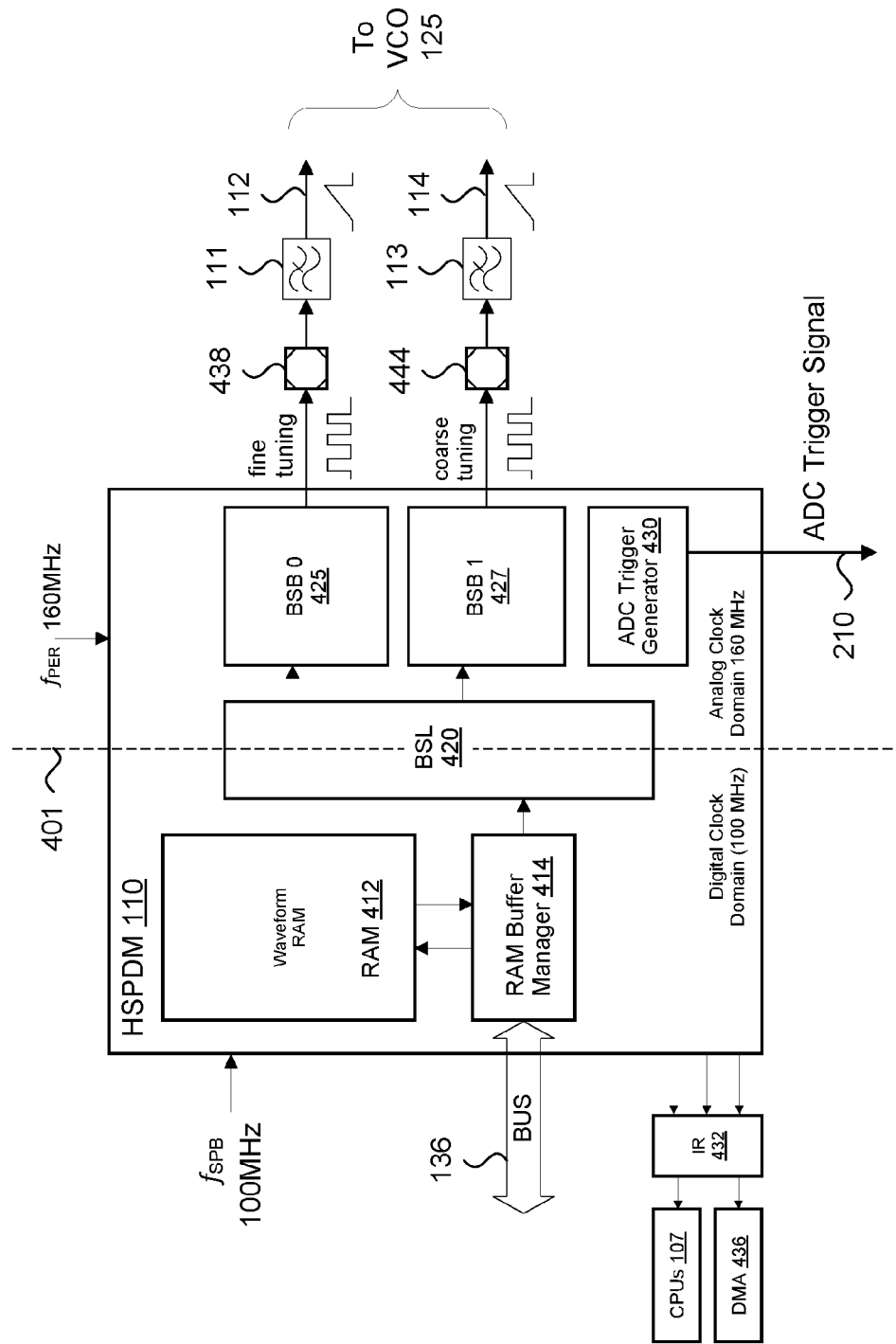
FIG. 4 illustrates a high speed pulse density modulator according to an exemplary embodiment of the present disclosure.

FIG. 4 illustrates the HSPDM 110 according to an exemplary embodiment of the present disclosure.

In an exemplary embodiment, the HSPDM 110 can be driven by two clocks, a 100 MHz clock signal $f_{SPB}$ and a 160 MHz clock signal $f_{PER}$. The present disclosure is not limited to these clock frequencies and the HSPDM 110 can operate on one or more other clock frequencies as would be understood by one of ordinary skill in the art. The clock signals can be generated by, for example, a quartz crystal oscillator (e.g., at 20 MHz) that drives corresponding phase locked loops (PLLs) that generate the 100 MHz clock signal $f_{SPB}$ and the 160 MHz clock signal $f_{PER}$.

In an exemplary embodiment, the HSPDM 110 includes memory 412, memory buffer manager 414, bit streaming loader (BSL) 420, a first bit streaming block (BSB) 425, a second BSB 427, and ADC (analog-to-digital converter) trigger generator 430.

In an exemplary embodiment, the BSBs 425, 427 and the ADC trigger generator 430 operate in an analog clock domain driven by the 160 MHz clock signal $f_{PER}$. The memory 412 and the memory buffer manager 414 operate in a digital clock domain driven by the 100 MHz clock signal $f_{SPB}$. The BSL 420 operates on both the 160 MHz analog clock domain and the 100 MHz digital clock domain. The two clock domains are illustrated by the clock domain border 401.

The memory 412 can be, for example, a random access memory (RAM), but is not limited thereto. The memory 412 can be configured to store one or more values used to drive the VCO 125. These values can be referred to as oscillator control values. The values can represent non-linearities of the VCO 125. In an exemplary embodiment, the values can be pre-computed, such as outside of active operation of the controller 105 (e.g., during production phases, calibration phases, etc.). The values may be loaded from another memory to the memory 412 upon start-up of the controller 105 and/or during active operations of the controller 105. In an exemplary embodiment, the frequency and quantities of values loaded to the memory 412 can be dynamically adjusted based on the operational conditions of the HSPDM 110. For example, more values and/or more frequently updated values can be loaded into the memory 412 during the start-up of the HSPDM 110 than during normal operation (e.g., when the HSPDM 110 and the VCO 125 has been continuously operating for an extended period of time). In this example, the more frequently updated values and/or large quantity of values can be loaded to compensate for temperature or other environmental changes of the VCO 125.

In an exemplary embodiment, the non-linearities of the VCO 125 are calculated at various environmental conditions (e.g., temperatures). The non-linear values define the voltage-to-frequency curve of the VCO 125. From these values, one or more inverse functions, such as polynomials can be calculated. In an exemplary embodiment, the values and/or the polynomials are calculated by the processor(s) 107.

The first and second BSBs 425, 427 can include one or more registers configured to receive one or more bit values from the BSL 420 and to output the stored values as a pulse density modulated (PDM) signal. In operation, the voltage signal 112 supplied to the VCO 125 can be generated based on the PDM signal outputted by the BSB 425 and the voltage signal 114 supplied to the VCO 125 can be generated based on the PDM signal outputted by the BSB 427. The corresponding PDM signals can be output to pins 438, 444 and fed to respective filters 111, 113, where the PDM signals can be filtered by filters 111 and 113.

In operation, the controller 105 can be configured to control the memory buffer manager 414 to load one or more values stored in the memory 412 to the BSL 420. The BSL 420 can then load the values into the BSBs 425 and 427.

In an exemplary embodiment, the BSB 425 and/or the BSB 427 can include a delta-sigma (Δ-Σ) modulator configured to modulate one or more bit values from the BSL 420 to generate a PDM signal having a resulting analog voltage signal 112, 114 having, for example, 16-bit accuracy. In an exemplary embodiment, the Δ-Σ modulator can be an N-order fast feed forward Δ-Σ modulator. The N-order fast feed forward Δ-Σ modulator can be, for example, a $2^{nd}$ order fast feed forward Δ-Σ modulator, but is not limited thereto. The Δ-Σ modulator can be configured to interpolate between two bit values (e.g., two target values (16 Bit)) from the BSL 420 to generate a PDM signal having increased accuracy while reducing the number of values in the memory 412 that are needed to generate the bit values provided by the BSL 420. In an exemplary embodiment, the Δ-Σ modulator can be configured to generate the PDM signal such that the PDM signal is more easily filtered by a corresponding filter 11, 113.

As discussed above, the BSB 425 and the BSB 427 operate on the 160 MHz clock signal $f_{PER}$. In this example, the 160 MHz operation allows the BSBs 425, 427 to generate a bit stream having increased granularity (i.e., increased resolution). The bit stream having the increased granularity provides a bit stream having high frequency range harmonics and the filters 111, 113 having increased attenuation leading to easier filtering of the PDM signal generated by the HSPDM 110.

In one or more exemplary embodiment, by including the local memory 412 within HSPDM 110, the BSL 420 and BSBs 425, 427 can be configured to cooperatively generate the PDM signals corresponding to the voltage signals 112, 114 while reducing the frequency and duration of communications (e.g., via bus 136) with the CPU 107. That is, the HSPDM 110 is configured to generate the voltage signals 112, 114 to drive the VCO 125 with limited intervention from the CPU 107. In this example, the CPU 107 can calculate one or more values used to drive the VCO 125 and store the values in the memory 412. These values can then be accessed by the BSL 420 via the memory buffer manager 414 to generate the bit values used by the BSBs 425, 427 to generate the PDM signals without requiring the HSPDM 110 to frequently receive values used to drive the VCO 125 from the CPU 107 or some other internal and/or external source. In this example, high throughput can be achieved at the output of the HSPDM 110 while having a low bandwidth load on the bus 136.

In operation, the CPU 107 can be configured to provide additional or new values to the HSPDM 110 that are used to drive the VCO 125. In an exemplary embodiment, the HSPDM 110 can generate an interrupt request signal via the interrupt router (IR) 432, which communicates with the CPU 107, one or more external memory units, and/or one or more peripheral devices within the controller 105. The memory units can be accessed by the IR 432 via a direct memory access module 436. The new or additional values can be provided from the CPU 107 to the HSPDM 110 via the bus 136. In an exemplary embodiment, the new and/or additional values can be delivered by the CPU 107 based on one or more calculations and/or measurements performed by the CPU 107, including calculations/measurements performed based on one or more applications running on the CPU 107. In an exemplary embodiment, additional or updated/new values can be provided by the CPU 107 based on one or more environmental conditions (e.g., temperature) of the VCO 125 or changes in environmental conditions. For example, upon initiation of the radar system 100 when the temperature changes may be greater.

The ADC trigger generator 430 can be configured to generate the ADC trigger signal 210 and provide the ADC trigger signal 210 to the ADC 130. In an exemplary embodiment, the HSPDM 110 can be configured to synchronously drive the VCO 125 via the BSBs 425, 427 and trigger the ADC 130 via the ADC trigger signal 210 to sample and/or process one or more analog signals 128 received from the sensor 120. In this example, because the ADC trigger signal 210 and the voltage signals 112, 114 are generated based on the same 160 MHz clock signal $f_{PER}$, the sampling by the ADC 130 can be synchronized with the voltage signals 112, 114 generated by the HSPDM 110. In this example, the HSPDM 110 can drive the VCO 125 with a reduced clock jitter.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

What is claimed is:

1. A modulator operable to control an oscillator, the modulator comprising:
    a memory driven by a first clock signal having a first clock frequency, the memory being configured to store oscillator control values;
    a bit streaming loader (BSL) driven by the first clock signal and a second clock signal having a second clock frequency different from the first clock frequency, the BSL being configured to:
        receive one or more of the oscillator control values from the memory; and
        generate one or more corresponding bit values based on the one or more of the oscillator control values; and
    a bit streaming block driven by the second clock signal, the bit streaming block being configured to:
        generate a bit stream based on the one or more bit values generated by the BSL; and
        transmit the bit stream to the oscillator to control the oscillator.

2. The modulator of claim 1, wherein the second clock frequency is greater than the first clock frequency.

3. The modulator of claim 2, wherein the first clock frequency is 100 MHz and the second clock frequency is 160 MHz.

4. The modulator of claim 1, wherein the oscillator control values define a voltage-to-frequency curve of the oscillator.

5. The modulator of claim 1, wherein the bit streaming block comprises one or more registers configured to generate the bit stream based on the bit values.

6. The modulator of claim 1, wherein the bit streaming block comprises a delta-sigma modulator configured to perform an interpolation operation on the bit values to generate the bit stream.

7. A sensor system comprising:
    a sensor including an oscillator configured generate a oscillation signal having an oscillation frequency, the sensor being configured to measure an environmental condition and to generate a signal corresponding to the measured environmental condition based on the oscillation frequency; and
    a controller configured to generate a bit stream to control the oscillation frequency of the oscillator and to process the signal corresponding to the measured environmental condition, the controller including a modulator driven by a first clock signal having a first clock frequency and a second clock signal having a second clock frequency different from the first clock frequency, the modulator including:
    a memory configured to store oscillator control values;
    a bit streaming loader (BSL) configured to:
        receive one or more of the oscillator control values from the memory;
        generate one or more corresponding bit values based on the one or more of the oscillator control values; and
    a bit streaming block configured to:
        generate a bit stream based the one or more bit values generated by the BSL; and
        transmit the bit stream to the oscillator of the sensor to control the oscillation frequency of the oscillator.

8. The sensor system of claim 7, wherein the memory is driven by the first clock signal, the bit streaming block is driven by the second clock signal, and the BSL is driven by both the first clock signal and the second clock signal.

9. The sensor system of claim 7, wherein the second clock frequency is greater than the first clock frequency.

10. The sensor system of claim 9, wherein the first clock frequency is 100 MHz and the second clock frequency is 160 MHz.

11. The sensor system of claim 7, wherein the oscillator control values define a voltage-to-frequency curve of the oscillator.

12. The sensor system of claim 7, wherein the bit streaming block comprises a delta-sigma modulator configured to perform an interpolation operation on the bit values to generate the bit stream.

13. The sensor system of claim 7, wherein the modulator further comprises a trigger generator configured to generate a trigger signal, the controller being configured to process the signal corresponding to the measured environmental condition based on the trigger signal.

14. The sensor system of claim 13, wherein the controller further comprises an analog-to-digital converter (ADC) configured to process the signal corresponding to the measured environmental condition based on the trigger signal, wherein the bit streaming block and the trigger generator are driven by a same one of the first or the second clock signals.

15. A modulator operable to control an oscillator of a sensor, the
modulator comprising:
a memory driven by a first clock signal having a first clock frequency, the memory being configured to store oscillator control values;
bit streaming loader (BSL) driven by the first clock signal and a second clock signal having a second clock frequency greater than the first clock frequency, the BSL being configured to:
receive one or more of the oscillator control values from the memory; and
generate one or more corresponding bit values based on the one or more of the oscillator control values;
a bit streaming block driven by the second clock signal and being configured to:
generate a bit stream based the one or more bit values generated by the BSL; and
transmit the bit stream to the oscillator of the sensor to control the oscillation frequency of the oscillator; and
a trigger generator driven by the second clock signal and being configured to generate a trigger signal to process a sensor signal from the sensor corresponding to an environmental condition measured by the sensor.

16. The modulator of claim 15, wherein the sensor is a radar sensor and the environmental condition measured by the radar sensor includes position information and/or movement information of an object.

17. The modulator of claim 1, wherein the oscillator control values comprise non-linearity characteristics of the oscillator.

18. The sensor system of claim 8, wherein the second clock frequency is greater than the first clock frequency.

19. The modulator of claim 1, wherein the bit streaming block is configured to transmit the bit stream to the oscillator to control an oscillation frequency of the oscillator.

* * * * *